US012566436B2

(12) United States Patent
Nojiri et al.

(10) Patent No.: US 12,566,436 B2
(45) Date of Patent: Mar. 3, 2026

(54) MANEUVERING CONTROL DEVICES FOR VESSELS, VESSELS

(71) Applicants: HONDA MOTOR CO., LTD., Tokyo (JP); NIDEC ELESYS CORPORATION, Kanagawa (JP)

(72) Inventors: Daisuke Nojiri, Saitama (JP); Takashi Hashizume, Saitama (JP); Yuichi Nakamura, Kanagawa (JP)

(73) Assignees: HONDA MOTOR CO., LTD, Tokyo (JP); NIDEC ELESYS CORPORATION, Kanagawa (JP)

( * ) Notice: Subject to any disclaimer, the term of this patent is extended or adjusted under 35 U.S.C. 154(b) by 274 days.

(21) Appl. No.: 18/333,541

(22) Filed: Jun. 13, 2023

(65) Prior Publication Data

US 2024/0419168 A1      Dec. 19, 2024

(51) Int. Cl.
| | | |
|---|---|---|
| *B63B 79/10* | (2020.01) | |
| *B63B 79/40* | (2020.01) | |

(Continued)

(52) U.S. Cl.
CPC ........... *G05D 1/0206* (2013.01); *B63B 79/10* (2020.01); *B63B 79/40* (2020.01); *G01S 13/89* (2013.01)

(58) Field of Classification Search
CPC ........ B25J 5/007; B25J 15/0491; B25J 9/162; B25J 19/005; B25J 9/0084; B25J 9/0009;

(Continued)

(56) References Cited

U.S. PATENT DOCUMENTS

| | | | |
|---|---|---|---|
| 6,788,618 B2 * | 9/2004 | Clayton | ................. G01V 1/006 |
| | | | 367/13 |
| 6,901,028 B2 * | 5/2005 | Clayton | ................. G01V 1/006 |
| | | | 367/13 |

(Continued)

FOREIGN PATENT DOCUMENTS

JP        4194493 B2    12/2008

OTHER PUBLICATIONS

Ruiz et al., A Short-Range Ship Navigation System Based on Ladar Imaging and Target Tracking for Improved Safety and Efficiency, 2009, IEEE, p. 186-197 (Year: 2009).*

(Continued)

*Primary Examiner* — Mcdieunel Marc
(74) *Attorney, Agent, or Firm* — CKC & PARTNERS CO., LLC

(57)        ABSTRACT

A maneuvering control device for vessels, and vessels are provided, which recognize docks with high accuracy. A maneuvering control device 1 for a vessel 500 includes: a vessel self-position data acquisition unit P that acquires position data on itself; a radar device R arranged on a hull, the radar device receiving a reflected wave from an object of a radio wave transmitted around the hull; and a vessel-maneuvering data processing unit 100 that creates a map of around the hull and estimates a vessel self-position by using the position data acquired by the vessel self-position data acquisition unit P and data on the reflected wave received by the radar device R, in which the vessel-maneuvering data processing unit 100 creates a map by removing received values below a threshold from the data on the reflected wave.

8 Claims, 14 Drawing Sheets

(51) Int. Cl.
*G01S 13/89*      (2006.01)
*G05D 1/00*      (2006.01)

(58) Field of Classification Search
CPC ......... A61B 34/30; A61B 50/13; A61B 34/37;
A61B 90/37; A61B 2034/304; A61B
2034/305; B60B 19/12; B60B 19/003;
G05B 2219/40307; G05B 2219/40298
See application file for complete search history.

(56)          References Cited

U.S. PATENT DOCUMENTS

| | | | |
|---|---|---|---|
| 9,267,340 B2 * | 2/2016 | Ankargren | B66C 13/02 |
| 11,964,742 B2 * | 4/2024 | Kadota | B63B 79/40 |
| 11,987,340 B2 * | 5/2024 | Kadota | G05D 1/2435 |
| 2010/0002536 A1 * | 1/2010 | Brewer | G01V 1/3817 |
| | | | 367/16 |
| 2024/0238984 A1 * | 7/2024 | Kamon | B25J 9/162 |

OTHER PUBLICATIONS

Arguedas et al., Spatio-temporal data mining for maritime situational awareness, 2015, IEEE, p. 1-8 (Year: 2015).*
Skulstad et al., Dead Reckoning of Dynamically Positioned Ships: Using an Efficient Recurrent Neural Network, 2019, IEEE, p. 39-51 (Year: 2019).*
Sorial et al., Towards a Real Time Obstacle Detection System for Unmanned Surface Vehicles, 2019, IEEE, p. 1-8 (Year: 2019).*

\* cited by examiner

FIG. 2

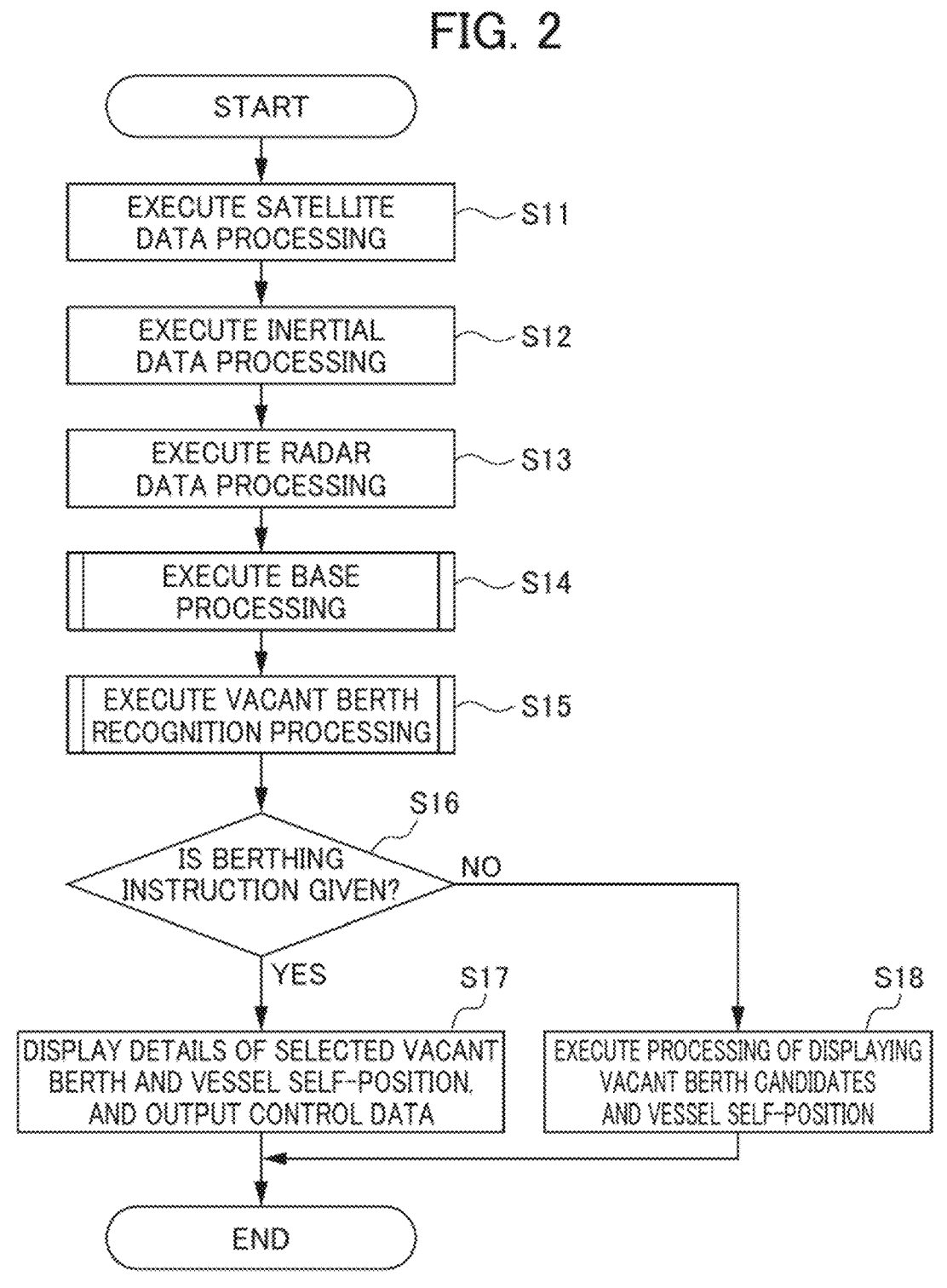

START

EXECUTE SATELLITE
DATA PROCESSING — S11

EXECUTE INERTIAL
DATA PROCESSING — S12

EXECUTE RADAR
DATA PROCESSING — S13

EXECUTE BASE
PROCESSING — S14

EXECUTE VACANT BERTH
RECOGNITION PROCESSING — S15

S16
IS BERTHING
INSTRUCTION GIVEN?

NO

YES

S17
DISPLAY DETAILS OF SELECTED VACANT
BERTH AND VESSEL SELF-POSITION,
AND OUTPUT CONTROL DATA

S18
EXECUTE PROCESSING OF DISPLAYING
VACANT BERTH CANDIDATES
AND VESSEL SELF-POSITION

END

Figure 10:
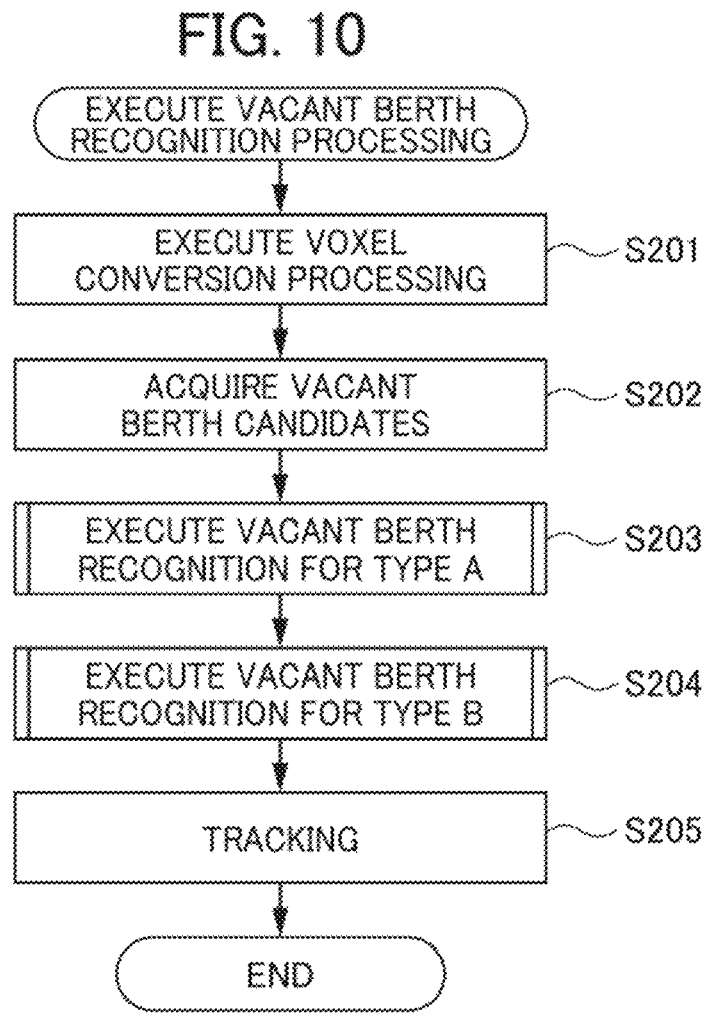

EXECUTE VACANT BERTH
RECOGNITION PROCESSING

EXECUTE VOXEL
CONVERSION PROCESSING — S201

ACQUIRE VACANT
BERTH CANDIDATES — S202

EXECUTE VACANT BERTH
RECOGNITION FOR TYPE A — S203

EXECUTE VACANT BERTH
RECOGNITION FOR TYPE B — S204

TRACKING — S205

END

Figure 13:
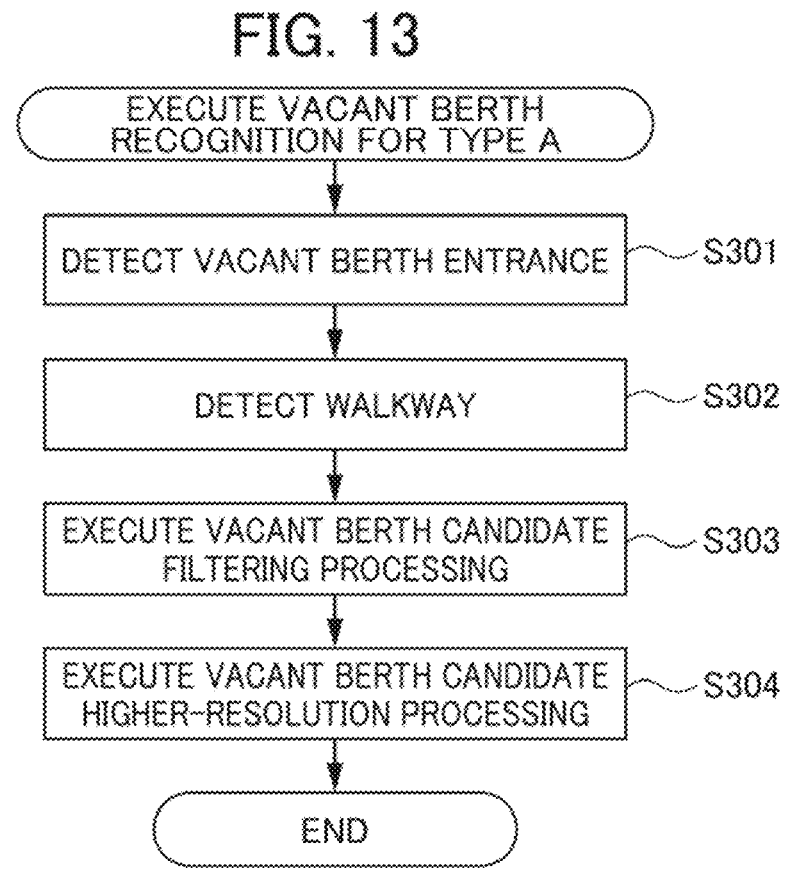

EXECUTE VACANT BERTH
RECOGNITION FOR TYPE A

DETECT VACANT BERTH ENTRANCE — S301

DETECT WALKWAY — S302

EXECUTE VACANT BERTH CANDIDATE
FILTERING PROCESSING — S303

EXECUTE VACANT BERTH CANDIDATE
HIGHER-RESOLUTION PROCESSING — S304

END

FIG. 14

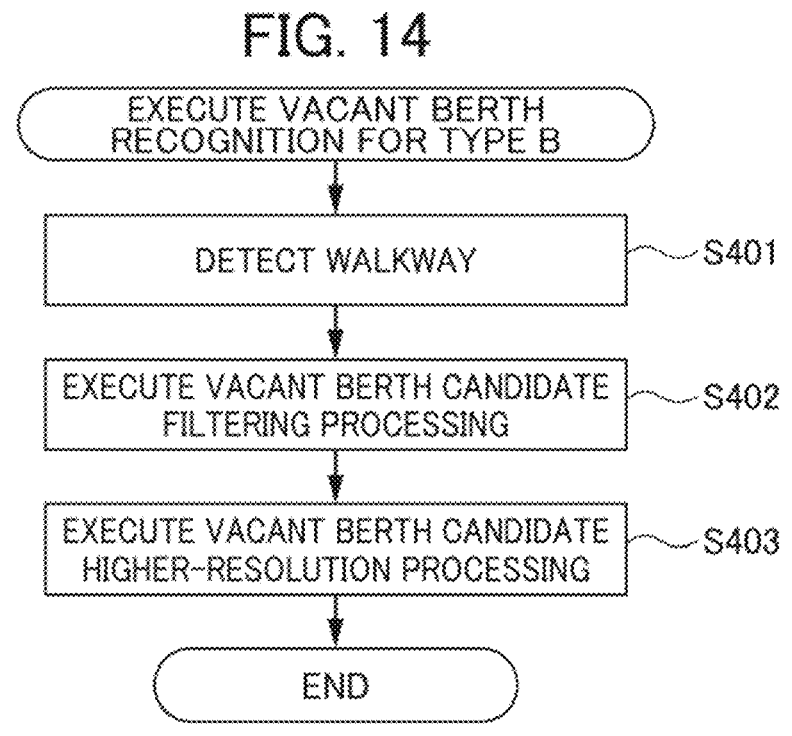

EXECUTE VACANT BERTH
RECOGNITION FOR TYPE B

DETECT WALKWAY — S401

EXECUTE VACANT BERTH CANDIDATE
FILTERING PROCESSING — S402

EXECUTE VACANT BERTH CANDIDATE
HIGHER-RESOLUTION PROCESSING — S403

END

MANEUVERING CONTROL DEVICES FOR VESSELS, VESSELS

BACKGROUND OF THE INVENTION

Field of the Invention

The present disclosure relates to maneuvering control devices for vessels, and vessels.

Related Art

Patent Document 1 discloses a technique for automatically navigating towards a dock by recognizing the dock with a plurality of radars installed on the vessel's hull, as well as a technique for visually displaying a distance between the recognized dock and the vessel.

Patent Document 1: Japanese Patent No. 4194493

SUMMARY OF THE INVENTION

However, when using radars, especially over the sea or lakes, there has been a risk of recognizing objects that are not docks or other vessels, such as floating plastic containers or bottles, plastic bags, wood chips, etc. which do not need to be avoided, or the rain splashing on the water surface when raining, all of which resulted in low accuracy in recognizing docks.

The problem addressed by the present disclosure is to provide a maneuvering control device for vessels and vessels, which recognize docks with high accuracy.

The present disclosure resolves the aforementioned problem through the following solutions. In order to facilitate understanding, reference numerals corresponding to embodiments of the present disclosure are used in description, which are not limiting.

The first disclosure is a maneuvering control device (1) for vessels (500), in which the device includes: a vessel self-position data acquirer (P) that acquires position data on itself; a radar device (R) arranged on a hull, the radar device (R) receiving a reflected wave from an object of a radio wave transmitted around the hull; and a processor (100) that creates a map and estimates a vessel self-position by using the position data acquired by the vessel self-position data acquirer (P) and data on the reflected wave received by the radar device (R), in which the processor (100) creates a map by removing received values below a threshold from the data on the reflected wave.

The second disclosure is the maneuvering control device (1) for vessels (500) according to the first disclosure, in which the processor (100) creates a map by using data on a reflected wave that has been detected a predetermined number of times within a predetermined period of time in a range that can be considered to be the same point, among the data on the reflected wave.

The third disclosure is the maneuvering control device (1) for vessels (500) according to the second disclosure, in which the vessel self-position data acquirer (P) includes an inertia measurer (20, 103, 104) that measures an inertial system, and the processor (100) estimates a vessel self-position by using a result of estimating a sway due to a disturbance by using a result of measurement by the inertia measurer (20, 103, 104).

The fourth disclosure is the maneuvering control device (1) for vessels (500) according to the first disclosure, in which the radar device (R) includes a plurality of radar units

(30) each including a transmitter and a receiver, and transmission timings of at least adjacent radar units (30) are out of synchronization.

The fifth disclosure is the maneuvering control device (1) for vessels (500) according to the first disclosure, including: a receiver (40) that receives a berthing instruction from a user, in which the radar device (R) includes a plurality of radar units (30) each including a transmitter and a receiver, the berthing instruction includes at least an instruction on a berthing side of the hull, and the processor (100) decreases processing frequency of the radar units (30) provided on a side opposite to the berthing side instructed in the berthing instruction.

The sixth disclosure is the maneuvering control device (1) for vessels (500) according to the first disclosure, in which the processor (100) removes a reflected wave with an RCS value below a threshold to create a map, the processor calculating the RCS from the data on the reflected wave.

The seventh disclosure is the maneuvering control device (1) for vessels (500) according to the first disclosure, in which the processor (100) estimates a dock in the map created, and executes processing of recognizing a berthable dock, based on a shape of the dock estimated.

The eighth disclosure is the maneuvering control device (1) for vessels (500) according to the seventh disclosure, in which, when the dock is estimated to have a U-shape including a walkway (601) and two or more fingers (602) where the vessels can berth at, a berthable vacant berth is extracted after detecting a vacant berth entrance.

The ninth disclosure is the maneuvering control device (1) for vessels (500) according to the seventh disclosure, in which, when the dock is estimated to include a berthable walkway, a berthable vacant berth is extracted without detecting a vacant berth entrance.

The tenth disclosure is a vessel (500) including: a hull; a vessel self-position data acquirer (P) that acquires position data on itself; a radar device (R) arranged on the hull, the radar device (R) receiving a reflected wave from an object of a radio wave transmitted around the hull; and a processor (100) that creates a map and estimates a vessel self-position by using the position data acquired by the vessel self-position data acquirer (P) and data on the reflected wave received by the radar device (R), in which the processor (100) creates a map by removing a received value below a threshold from the data on the reflected wave.

According to the present disclosure, a maneuvering control device for vessels and a vessel, which recognize docks with high accuracy, can be provided.

BRIEF DESCRIPTION OF THE DRAWINGS

FIG. 2 is a flowchart illustrating the overall operation flow of a maneuvering control device 1 for vessels;

FIG. 6 is a graph illustrating a result of executing mapping processing using data on reflected waves acquired in rainy weather, without further processing;

FIG. 10 is a flowchart illustrating vacant berth recognition processing in further detail;

FIG. 12 is a diagram illustrating an example of a Type B dock as viewed from above;

FIG. 13 is a flowchart illustrating the vacant berth recognition for Type A in further detail; and FIG. 14 is a flowchart illustrating the vacant berth recognition for Type B in more detail.

DETAILED DESCRIPTION OF THE INVENTION

Hereinafter, an embodiment for carrying out the present disclosure will be described with reference to the drawings.

Embodiment

Figure 1:
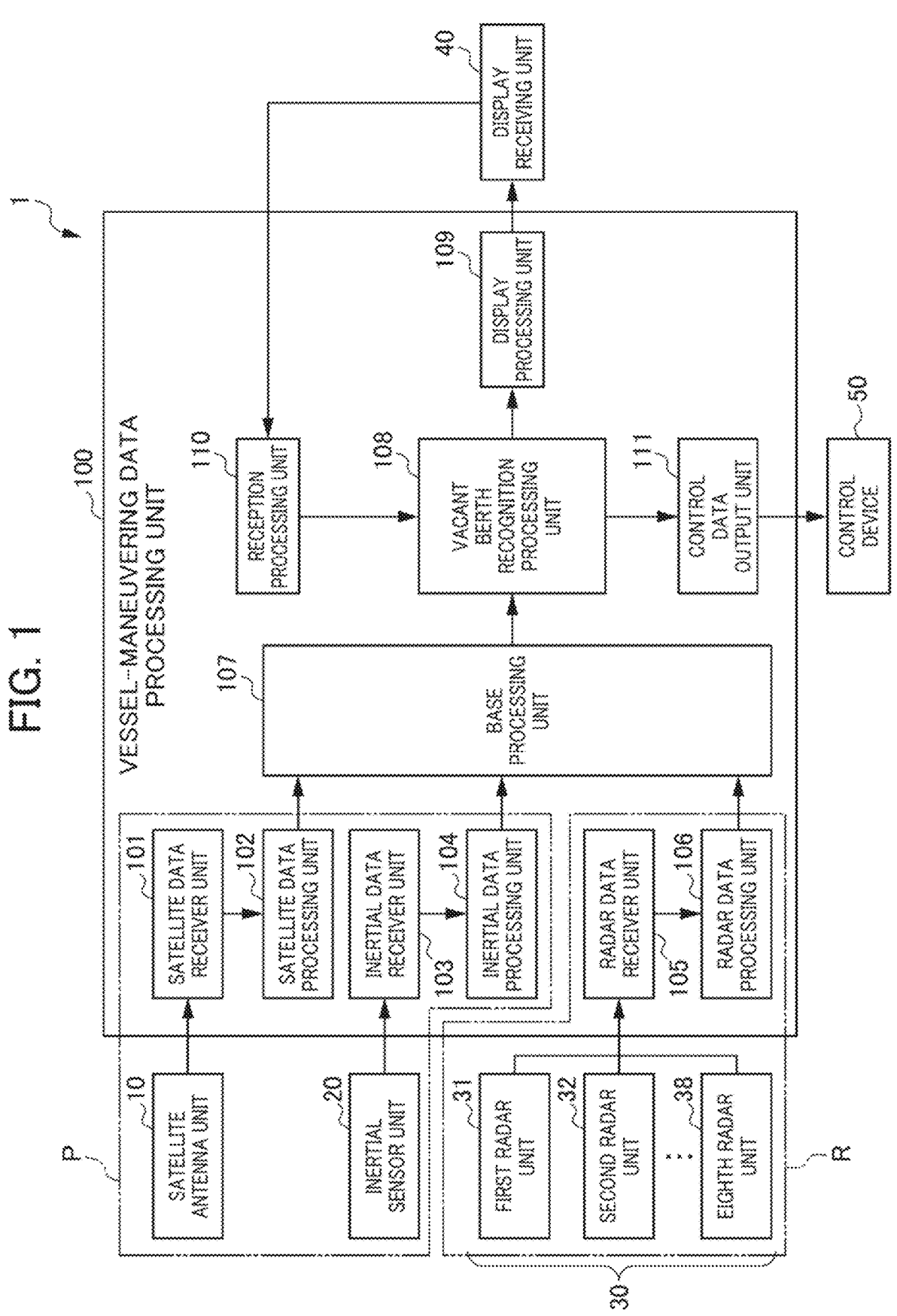
FIG. 1 is a block diagram illustrating an embodiment of a maneuvering control device for vessels according to the present disclosure.

FIG. 1 is a block diagram illustrating an embodiment of a maneuvering control device for vessels according to the present disclosure. In each drawing illustrated below, the size and shape of each component are exaggerated or omitted as appropriate for easy understanding. In the following description, specific numerical values, shapes, materials, etc. will be described, but can be changed as appropriate.

A maneuvering control device 1 for vessels of the present embodiment is installed on a vessel and executes control related to vessel maneuvering. In particular, the maneuvering control device 1 for vessels of the present embodiment, and a vessel 500 equipped with this device can appropriately display data beneficial for berthing (docking) and can berth by automatic maneuvering. The maneuvering control device 1 for vessels of the present embodiment includes a satellite antenna unit 10, an inertial sensor unit 20, a radar unit 30, a vessel-maneuvering data processing unit 100 as a processor, a display receiving unit 40, and a control device 50.

The satellite antenna unit 10, for example, uses GPS (Global Positioning System) to acquire data from a satellite. The antenna used for the satellite antenna unit 10 is not limited to GPS and may be one that acquires data from other satellite positioning systems. A plurality of satellite antenna units 10 may be provided on one vessel to improve positioning accuracy. The satellite data acquired by the satellite antenna unit 10 is sent to the satellite data receiver unit 101.

The inertial sensor unit 20 is a sensor of an inertia measurement unit (IMU) that includes gyro sensors and acceleration sensors and is fixed to the vessel. A 6-axis inertial sensor equipped with a 3-axis acceleration sensor and a 3-axis gyro sensor is desirably used for the inertial sensor unit 20. The inertial data acquired by the inertial sensor unit 20 is sent to the inertial data receiver unit 103.

The radar unit 30 includes a transmitter unit that transmits radar waves, and a receiver unit that receives reflected waves that are transmitted by the transmitter unit and reflected back from the object. A plurality of radar units 30 are arranged on the vessel so as to be able to detect objects in all directions around the vessel. The radar data acquired by the radar unit 30 is sent to the radar data receiver unit 105.

The vessel-maneuvering data processing unit 100 executes control related to recognition of vacant berths (vacant docks) and automatic berthing at a vacant berth. The vessel-maneuvering data processing unit 100 is configured with, for example, a CPU, ROM, RAM, etc. The vessel-maneuvering data processing unit 100 loads a program stored in a storage medium such as ROM into RAM, and executes the program on the CPU to execute various controls.

The vessel-maneuvering data processing unit 100 includes a satellite data receiver unit 101, a satellite data processing unit 102, an inertial data receiver unit 103, an inertial data processing unit 104, a radar data receiver unit 105, a radar data processing unit 106, a base processing unit 107, a vacant berth recognition processing unit 108, a display processing unit 109, a reception processing unit 110, and a control data output unit 111.

The satellite data receiver unit 101 receives satellite data acquired by the satellite antenna unit 10. The satellite data includes, for example, time signals transmitted by each satellite. The satellite data received by the satellite data receiver unit 101 is sent to the satellite data processing unit 102.

The satellite data processing unit 102 calculates the position of the satellite antenna unit 10 using the satellite data sent from the satellite data receiver unit 101, and sends the calculated position data to the base processing unit 107. When there are a plurality of satellite antenna units 10, the position of each satellite antenna unit 10 is calculated.

The inertial data receiver unit 103 receives the inertial data acquired by the inertial sensor unit 20. The inertial data includes data such as angular velocity and acceleration in each detection axis. The inertial data received by the inertial data receiver unit 103 is sent to the inertial data processing unit 104.

The inertial data processing unit 104 executes calculations to determine three-dimensional inertial motion (translational and rotational motion in three orthogonal directions) of the inertial sensor unit 20 using the inertial data sent from the inertial data receiver unit 103. The inertial motion data calculated and determined by the inertial data processing unit 104 is sent to the base processing unit 107.

The radar data receiver unit 105 receives the radar data acquired by the radar unit 30, and sends the radar data to the radar data processing unit 106.

The radar data processing unit 106 generates radar reflection point group data using the radar data sent from the radar data receiver unit 105 and sends the generated data to the base processing unit 107.

The vessel self-position data acquisition unit P as a vessel self-position data acquirer that acquires self-position data is configured with the satellite antenna unit 10, the satellite data receiver unit 101, the satellite data processing unit 102, the inertial sensor unit 20, the inertial data receiver unit 103, and the inertial data processing unit 104 described above. In the vessel self-position data acquisition unit P, a satellite positioning unit is configured with the satellite antenna unit 10, the satellite data receiver unit 101, and the satellite data processing unit 102; and an inertia measurer is configured with the inertial sensor unit 20, the inertial data receiver unit 103, and the inertial data processing unit 104. A radar device R, which receives reflected waves from objects of radio waves transmitted to the surroundings, is configured with the radar unit 30, the radar data receiver unit 105, and the radar data processing unit 106.

The base processing unit 107 creates a map (mapping) and estimates the vessel self-position by using the position data acquired from the satellite data processing unit 102, the inertial motion data acquired from the inertial data processing unit 104, and the reflection point group data acquired from the radar data processing unit 106. The map processed and the vessel self-position data estimated by the base processing unit 107 are sent to the vacant berth recognition processing unit 108.

The vacant berth recognition processing unit 108 executes processing of recognizing vacant berths by using the map and the estimated vessel self-position data acquired from the base processing unit 107. Data on the vacant berth recognized by the vacant berth recognition processing unit 108 is sent to the display processing unit 109. After a vacant berth to berth at is specified by the user using the display receiving unit 40, the data on the vacant berth recognized by the vacant berth recognition processing unit 108 is sent to the control data output unit 111.

The display processing unit 109 generates display data for displaying, based on the data on the vacant berth recognized by the vacant berth recognition processing unit 108. The display data generated by the display processing unit 109 is sent to the display receiving unit 40 as a receiver and displayed by the display receiving unit 40.

The display receiving unit 40 displays the display data generated by the display processing unit 109. The display receiving unit 40 also functions as the receiver that receives berthing instructions such as which dock to berth at, or whether the portside or the starboard side should be used for berthing. The display receiving unit 40 can be configured with a touch panel, for example, and can also be configured with a display unit and an input unit separately. The display receiving unit 40 can receive an input from the user to specify a berth (dock) to berth at, from among the vacant berth candidates displayed. The input data received by the display receiving unit 40 is sent to the reception processing unit 110.

The reception processing unit 110 acquires the input data received by the display receiving unit 40 and sends the data on the berth to berth at, to the vacant berth recognition processing unit 108.

The control data output unit 111 sends various data necessary for berthing at the specified berth (such as the map, the vessel self-position data, the data on the berth to berth at, and the data acquired from the radar device R) to the control device 50. The data to be sent to the control device 50 is not limited to those illustrated above and can be changed as appropriate.

The control device 50 controls the vessel's propulsion system and steerage equipment, based on the data acquired from the control data output unit 111, and executes automatic berthing or assists in manual berthing.

Next, operations of the maneuvering control device 1 for vessels of the present embodiment will be described in further detail. FIG. 2 is a flowchart illustrating the overall operation flow of the maneuvering control device 1. Note that the flowchart illustrated in FIG. 2, etc. is merely an example, and the sequence can be appropriately changed, or some operations can be processed simultaneously in parallel. Unless otherwise specified, processing in each flowchart illustrated below is the operation executed by the vessel-maneuvering data processing unit 100.

In Step 11 (Step is hereafter referred to as S), satellite data processing is executed. Specifically, the satellite data receiver unit 101 and the satellite data processing unit 102 calculate the position of the satellite antenna unit 10 by using the satellite data acquired from the satellite antenna unit 10, and send the calculated position data to the base processing unit 107.

In S12, inertial data processing is executed. Specifically, the inertial data receiver unit 103 and the inertial data processing unit 104 calculate a three-dimensional inertial motion of the inertial sensor unit 20 by using the inertial data acquired from the inertial sensor unit 20, and send the calculated inertial motion data to the base processing unit 107.

Figure 3:
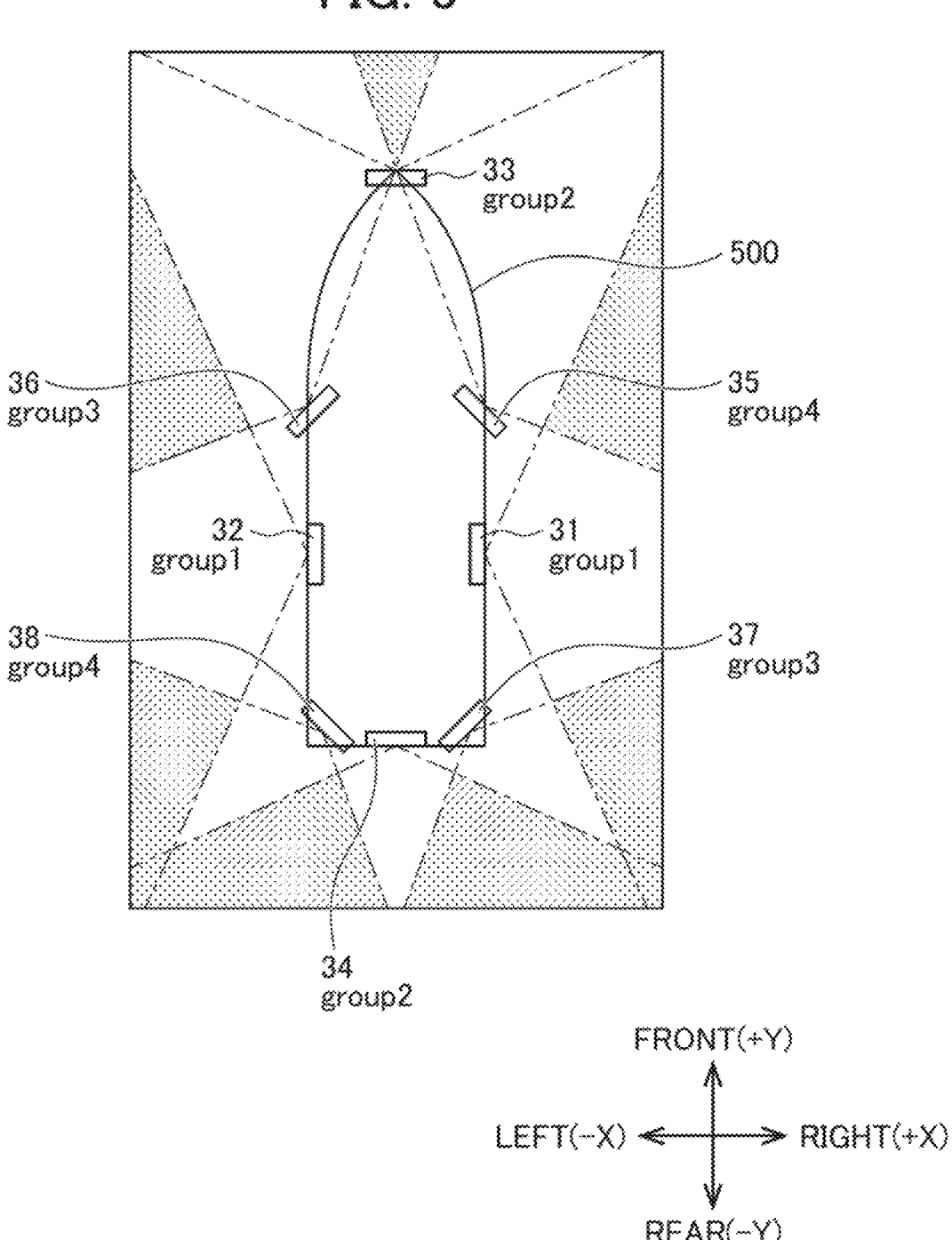
FIG. 3 is a diagram illustrating an arrangement of radar units 30 and an irradiation range of radar waves as viewed from above a vessel 500.

In S13, radar data processing is executed. Specifically, the radar data receiver unit 105 and the radar data processing unit 106 generate radar reflection point group data by using the radar data acquired by the radar unit 30, and send the data to the base processing unit 107. FIG. 3 illustrates a diagram of the vessel 500 as viewed from above, illustrating the arrangement of the radar units 30 as well as the transmission range of the radar waves. The plurality of radar units 30 are arranged on the vessel so as to be able to detect objects in all directions around the vessel. As illustrated in FIG. 3, in the present embodiment, the radar unit 30 includes a total of eight radar units: a first radar unit 31, a second radar unit 32, a third radar unit 33, a fourth radar unit 34, a fifth radar unit 35, a sixth radar unit 36, a seventh radar unit 37, and an eighth radar unit 38, each pointing in different directions.

In FIG. 3, the XY coordinates are set based on the vessel, in the front (+Y), rear (−Y), left (−X), and right (+X) directions indicated by the arrows, and are described in detail below. The first radar unit 31 is installed on the starboard side of the hull, and irradiates radar waves within a predetermined range centered on the +X axis direction. The second radar unit 32 is installed on the port side of the hull, and irradiates radar waves within a predetermined range centered on the −X axis direction. The third radar unit 33 is installed at the front end of the hull, and irradiates radar waves within a predetermined range centered on the +Y axis direction. The fourth radar unit 34 is installed at the rear end of the hull, and irradiates radar waves within a predetermined range centered on the −Y axis direction. The fifth radar unit 35 is installed towards the front end of the starboard side of the hull, and irradiates radar waves within a predetermined range centered on the right-front diagonal direction, tilted approximately 45 degrees each to the +X axis direction and the +Y axis direction. The sixth radar unit 36 is installed towards the front of the port side of the hull, and irradiates radar waves within a predetermined range centered on the left-front diagonal direction, tilted approximately 45 degrees each to the −X axis direction and the +Y axis direction. The seventh radar unit 37 is installed towards the rear of the starboard side of the hull, and irradiates radar waves within a predetermined range centered on the right-rear diagonal direction, tilted approximately 45 degrees each to the +X axis direction and the −Y axis direction. The eighth radar unit 38 is installed towards the rear of the port side of the hull, and irradiates radar waves within a predetermined range centered on the left-rear diagonal direction, tilted approximately 45 degrees each to the −X axis direction and the −Y axis direction.

In FIG. 3, the shaded areas are areas which are irradiated with the radar waves from the plurality of different radar units 30 and overlap. When a plurality of radar waves overlap, there is a risk that the radar waves may interfere with each other, preventing accurate acquisition of reflected waves. Therefore, in the present embodiment, the transmission timings of the radar units 30 are out of synchronization, that is the timings of the radar units 30 are not at the same time, to prevent interference between the radar waves. More specifically, two radar units 30 irradiating radio waves in substantially opposite directions are combined into one group, forming a total of four groups. Since the irradiation directions of the radar waves from the two radar units 30 within a group are substantially opposite, interference will not occur between the radar waves even if the radar waves are transmitted simultaneously. Therefore, by controlling the transmission timings to be out of synchronization for each group such that different groups do not simultaneously transmit radar waves, radar waves can be transmitted at shorter intervals while suppressing interference between radar waves.

Group 1 is configured with the first radar unit 31 and the second radar unit 32. Group 2 is configured with the third radar unit 33 and the fourth radar unit 34. Group 3 is configured with the sixth radar unit 36 and the seventh radar unit 37. Group 4 is configured with the fifth radar unit 35 and the eighth radar unit 38.

Figure 4:
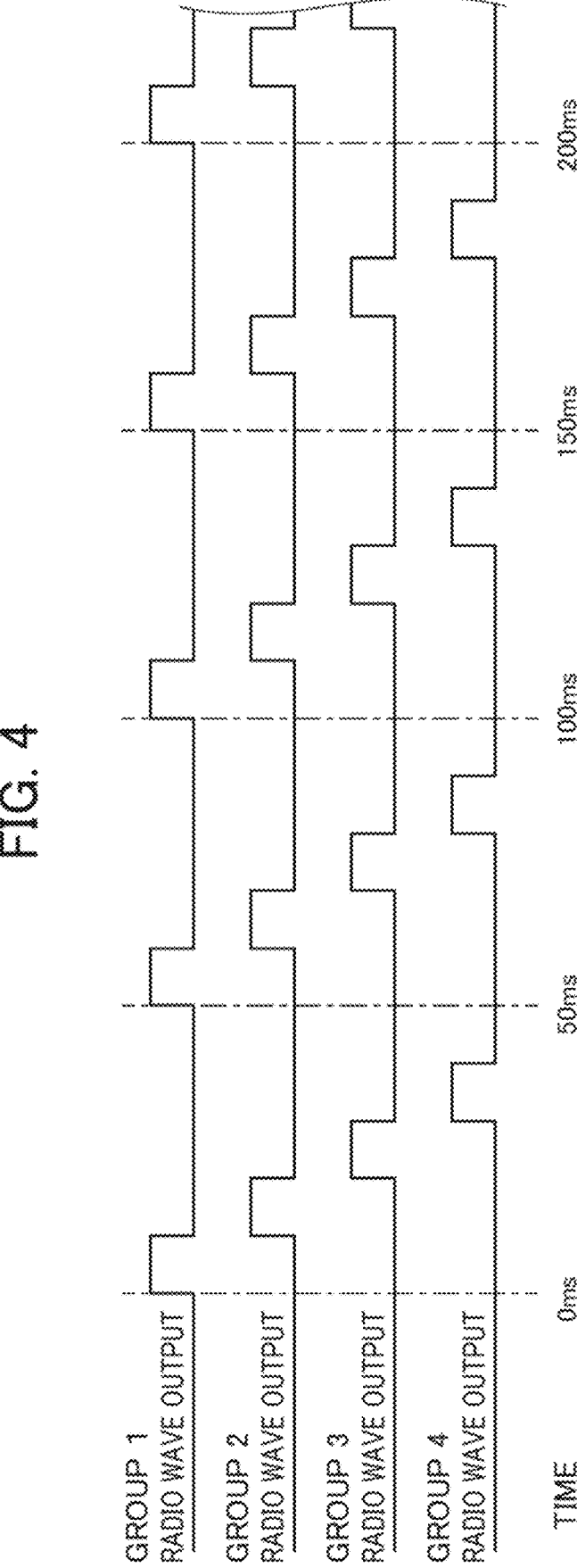
FIG. 4 is a timing chart of a radio wave output of each group of the radar units 30.

FIG. 4 is a timing chart of the radio wave output of the radar units 30 of each group. In FIG. 4, the radar waves are transmitted when the waveform of the radio wave output is high. In the example in FIG. 4, for all groups, the radio waves are outputted for only 10 ms, every 50 ms. The output of Group 2 is executed simultaneously as the output of Group 1 ends. Next, the output of Group 3 is executed at the same as the end of the output of Group 2. Next, the output of Group 4 is executed at the same as the end of the output of Group 3. When the output of Group 4 ends, there is a 10-ms wait time, and the output of Group 1 starts. Thereafter, the above output pattern is repeated. Note that the above grouping and output pattern are merely an example, and can be changed as appropriate; however, the transmission timings of at least adjacent radar units are desirably out of synchronization. This is because the risk of interference between radar waves is high in adjacent radar units. In the present embodiment, the recognition accuracy can be improved by suppressing interference between radars.

Figure 5:
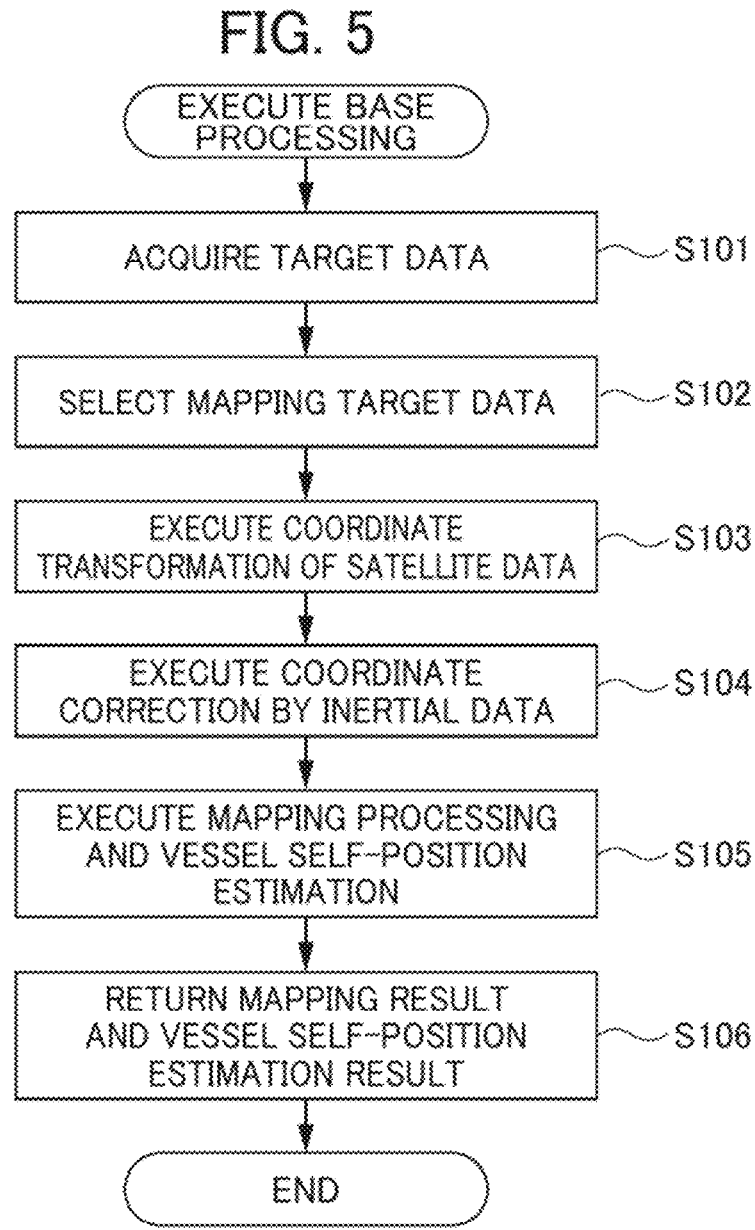
FIG. 5 is a flowchart illustrating base processing in further detail.

Returning to FIG. 2, in S14, the base processing unit 107 executes base processing. FIG. 5 is a flowchart illustrating the base processing in further detail. When the base processing starts, in S101, target data is acquired. The target data is the reflection point group data of the reflected waves that are reflected back from the object as a result of irradiation of radar waves.

In S102, mapping target data is selected. Here, selecting the mapping target data refers to selecting data that actually exists, such as docks or other vessels which need to be mapped, and the excluding data that is likely to be unnecessary. In the present embodiment, a plurality of methods are used for selecting mapping target data.

As the first method of selecting mapping target data, received values below a threshold are removed from the data on the reflected waves. On the sea or lake, reflected waves can be acquired from unnecessary objects such as plastic containers or bottles, plastic bags, wood chips, etc. (hereinafter, also referred to as trash, etc.) that do not need to be avoided, or the rain splashing on the water surface, which are not docks or other vessels. The data on reflected waves unnecessary for berthing should desirably be removed as noise. The reflected waves caused by trash or the rain splashing on the water surface often have relatively low received values. Therefore, in the present embodiment, the received values below a threshold are removed from the data on the reflected waves, whereby removing the noise components.

Figure 6:
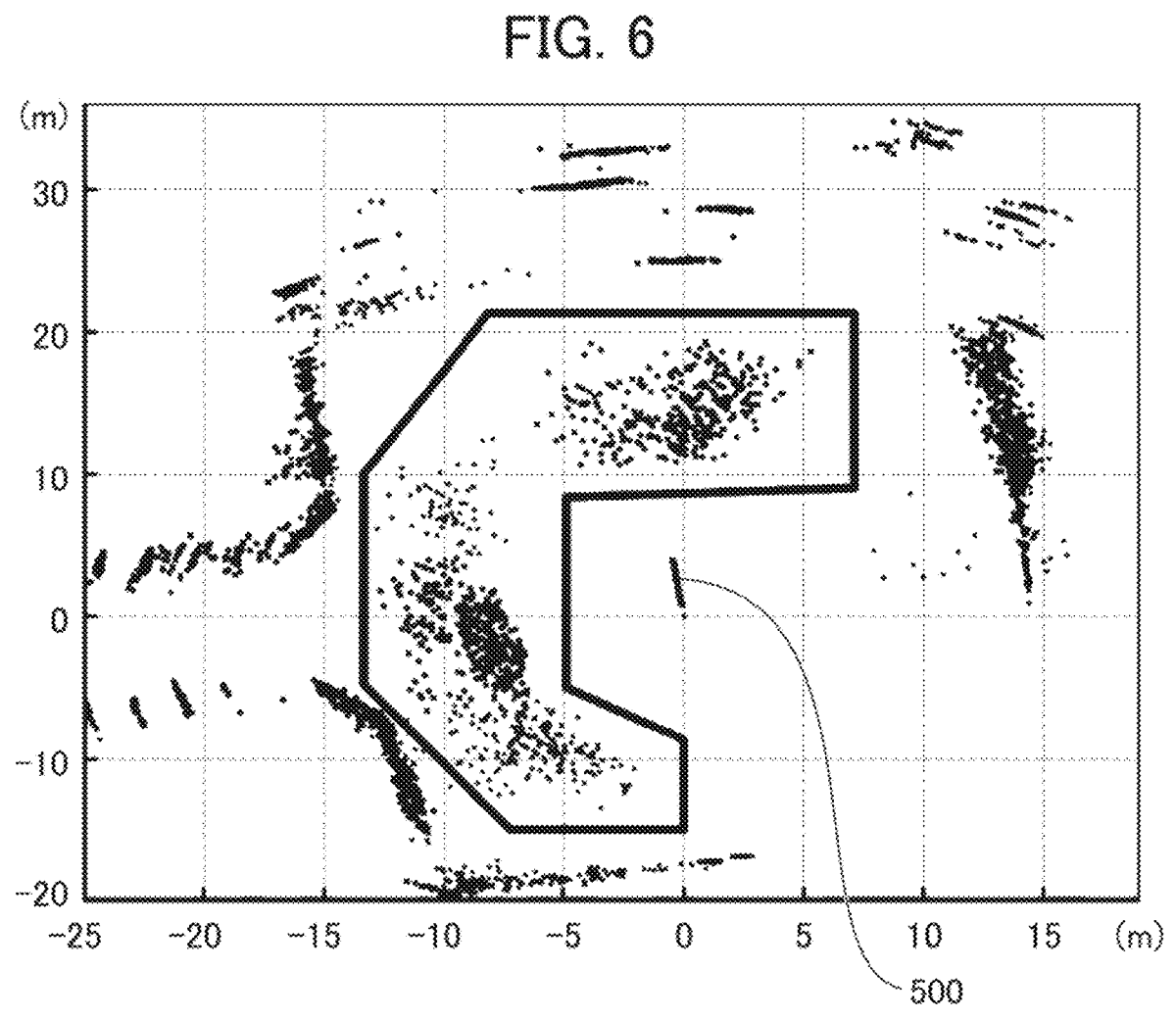
Figure 7:
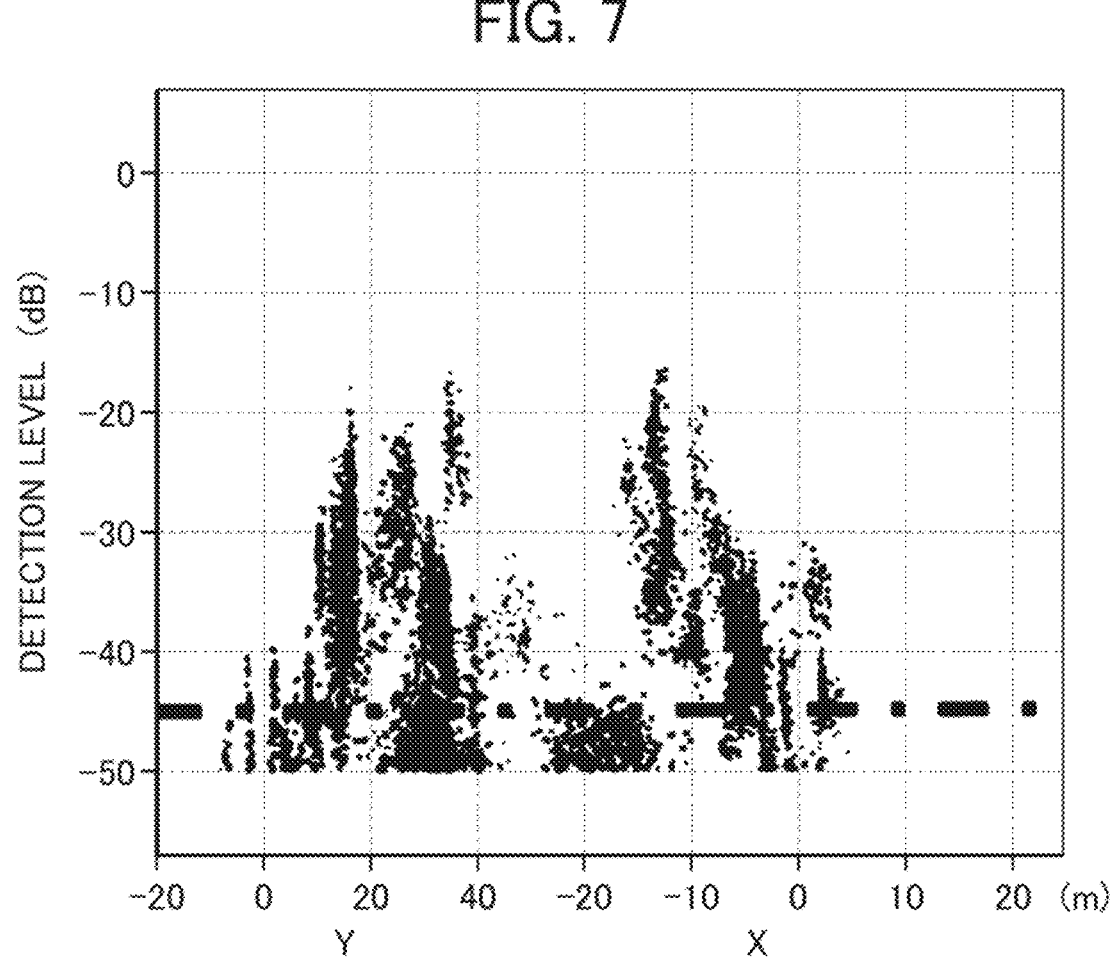
FIG. 7 is a graph illustrating the data of FIG. 6, in which the vertical axis represent the detection level.
Figure 8:
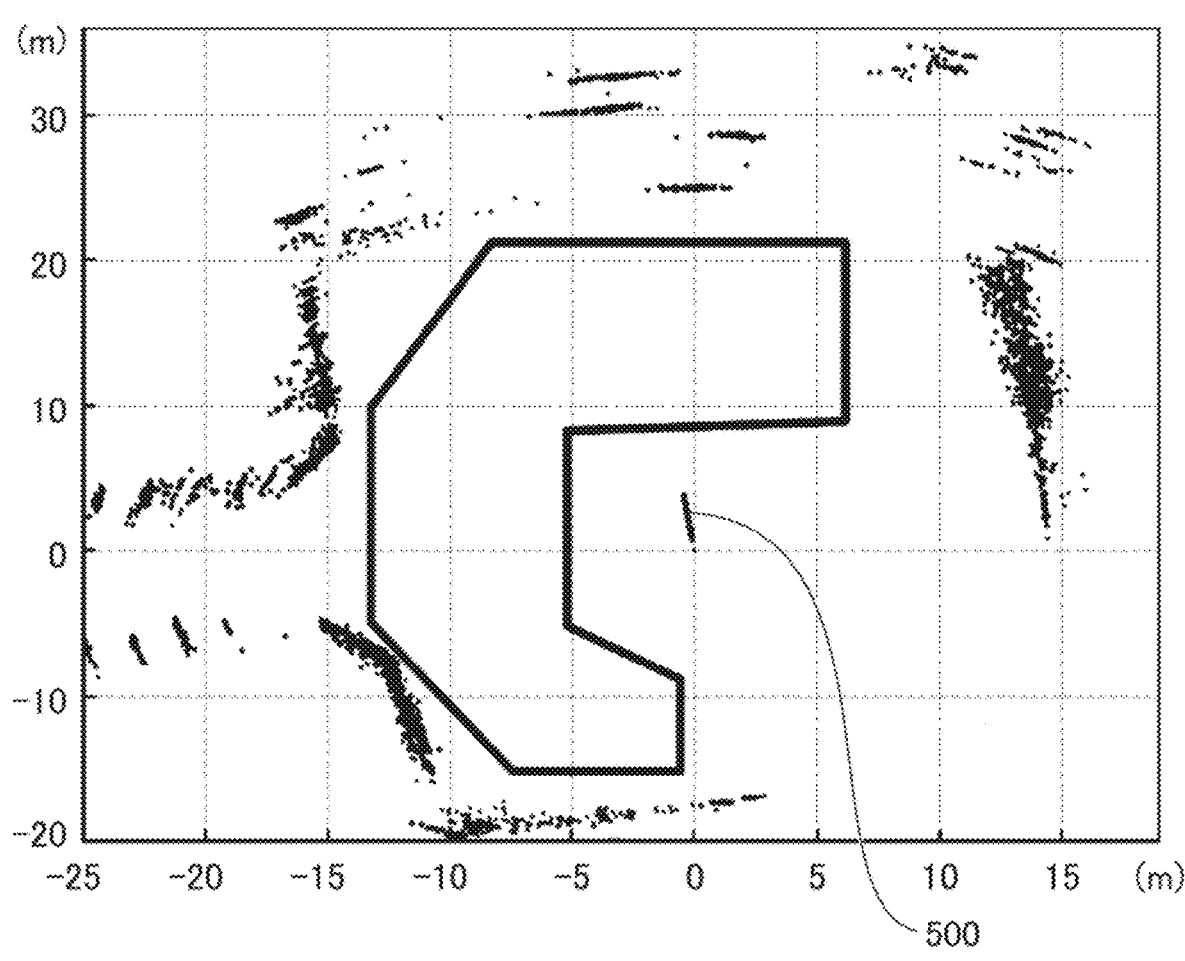
FIG. 8 is a graph illustrating a result of removing data below a threshold and re-executing mapping processing.

FIG. 6 is a graph illustrating a result of executing the mapping processing using data on the reflected waves acquired in rainy weather without further processing. The vertical and horizontal axes in FIG. 6 represent distance (m). The data illustrated in FIG. 6 is data acquired in six seconds, and the position of the vessel 500 is illustrated as the track moved during the six seconds. The range enclosed by the solid line in FIG. 6 is the sea surface, where the rain is actually splashing, and radar waves are reflected by this splashing and received as reflected waves. FIG. 7 is a graph, in which the data of FIG. 6 is taken as the vertical axis representing detection level. In FIG. 7, the horizontal axis represents distance (m), and the vertical axis represents detection level (dB). In FIG. 7, the coordinates corresponding to the horizontal axis and the vertical axis in FIG. 6 are replaced with X-axis and Y-axis, and the detection level is represented by the Z-axis, in which 3D plot data is replaced with 2D graph data, and the coordinates of X-axis and Y-axis are combined and illustrated on the horizontal axis. The scales of the X and Y axes are illustrated differently to make the drawing easy to see. The value indicated by the dotted line in FIG. 7 (−45 dB (RCS: −20 dBsm equivalent)) is used as a threshold, data below the threshold is removed, and the mapping processing is re-executed. Since the RCS (radar cross-section) of a dock is equivalent to −10 dBsm, docks can be appropriately detected even by using the above value as a threshold. FIG. 8 is a graph illustrating a result of re-executing the mapping processing after removing the data below the threshold. The vertical and horizontal axes in FIG. 8 represent the distance (m) as in the case of FIG. 6. In FIG. 8, the splashing by the rain enclosed by the solid line in FIG. 6 has disappeared, and a more realistic and appropriate mapping result has been acquired. In this manner, objects with radar values less frequently received (lower amount of reflection) are removed during mapping, whereby only objects (docks, other vessels, large buoys, etc.) important for automatic maneuvering can be recognized, and the accuracy of route setting and maneuvering control during automatic maneuvering can be increased.

The second method of selecting mapping target data in the present embodiment involves using data on reflected waves, in which reflected waves that have been detected a predetermined number of times within a predetermined period of time in a range considered to be the same point are used for creating a map. That is, a map is created by removing reflected waves that have not been detected a predetermined number of times within a predetermined period of time in a range considered to be the same point. If a plurality of reflected waves can be received at substantially the same point, it can be assumed that there is an object at the point. On the other hand, the rain splashing will not be continuously detected at the same point, thus can be removed as noise. As a result, the influence of the rain splashing can be further reduced, and the accuracy of route setting and maneuvering control during automatic maneuvering can be improved.

The third method of selecting mapping target data is to determine a radar cross-section (RCS) from data on reflected waves and remove object data equivalent to the water surface. Specifically, an RCS of a dock is determined in advance from a value received by the radar actually, an RCS value below the RCS of the dock is set as a threshold of RCS, and data of received values of RCS below the threshold is excluded. For example, a threshold value can be 50% or 30% of the RCS of the dock. As a result, reflected waves from objects significantly smaller than a dock can be removed, and for example, reflected waves from the water surface can be removed.

In S103, coordinate transformation of satellite data is executed. As an example of coordinate transformation of satellite data, latitude and longitude positional data acquired from satellite data is replaced with Cartesian coordinates. If coordinate transformation of satellite data is not required, this operation may be omitted.

Figure 9A:
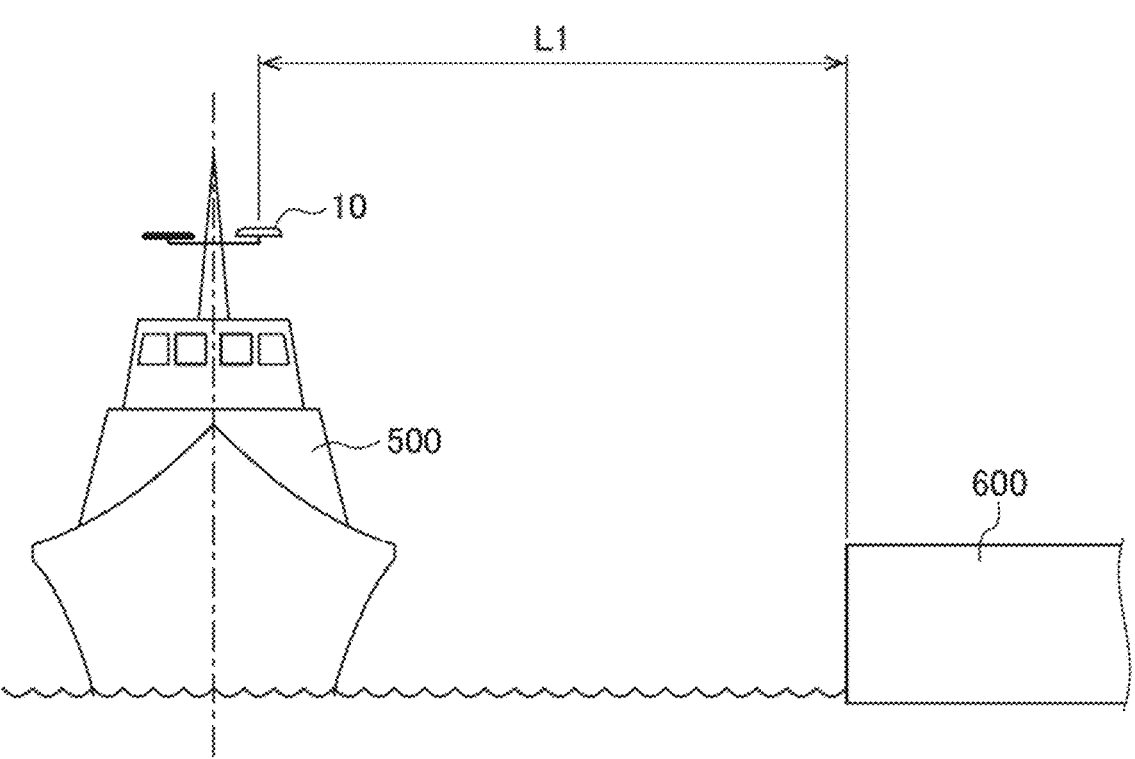
FIG. 9A is a diagram illustrating coordinate correction by inertial data.
Figure 9B:
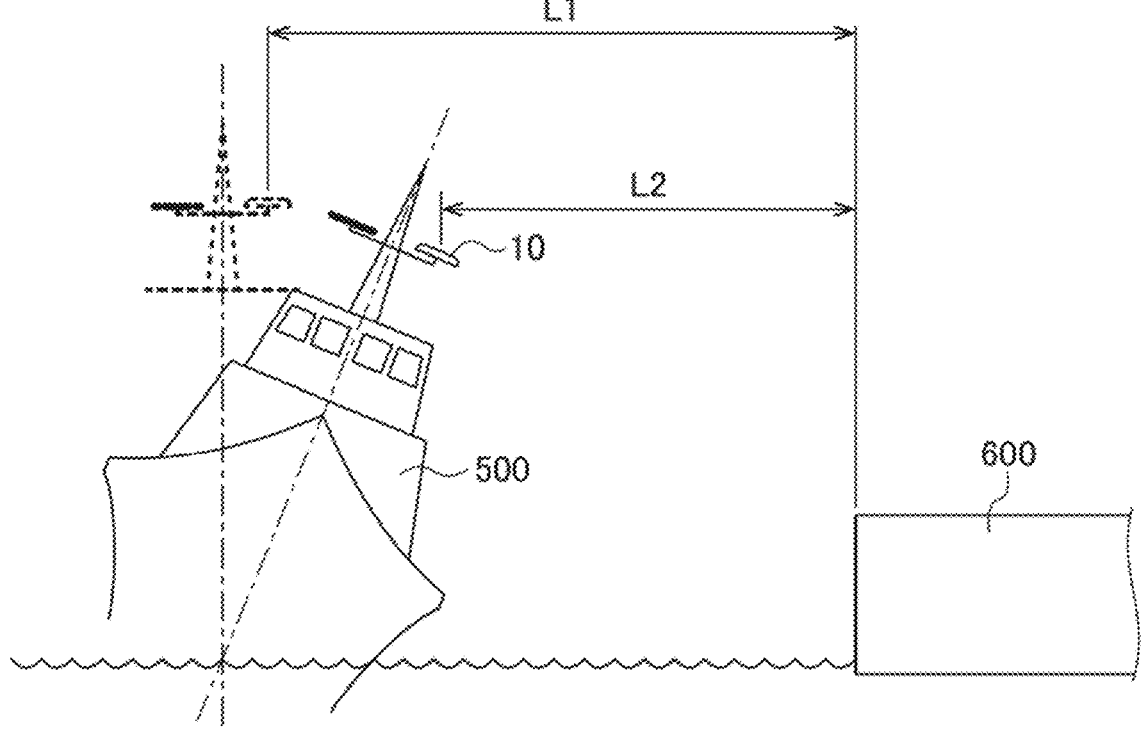
FIG. 9B is another diagram illustrating coordinate correction by inertial data.

In S104, coordinate correction by inertial data is executed. FIGS. 9A and 9B illustrate coordinate correction by inertial data. Although the satellite antenna unit 10 is fixed to the vessel 500, when the vessel 500 is swayed by disturbances such as waves and wind, the position of the satellite antenna unit 10 may significantly change. In the state illustrated in FIG. 9A where the vessel 500 is not tilted, the satellite antenna unit 10 is at a distance L1 from the dock 600. In the state illustrated in FIG. 9B where the vessel 500 is tilted, the satellite antenna unit 10 is at a distance L2 from the dock 600, but this distance L2 is shorter than the distance L1. In this manner, even if positional data is acquired as the position of the satellite antenna unit 10, there may be cases where the position of the vessel 500 is not correctly acquired. In particular, since the satellite antenna unit 10 is desirably arranged at a position where the radio waves from the satellites will not be blocked by the vessel itself, the satellite antenna unit 10 is preferably arranged at a high position as illustrated in FIGS. 9A and 9B. When the satellite antenna unit 10 is arranged at a high position, displacement of the satellite antenna unit 10 due to disturbances tends to be large.

In the present embodiment, the inertia measurer unit that measures the inertial system includes the inertial sensor unit 20, the inertial data receiver unit 103, and the inertial data processing unit 104. The vessel self-position is estimated by using a result of estimating the sway due to disturbances, which are estimated by using a result of measurement by the inertia measurer. In the present embodiment, the coordinates of the vessel self-position are corrected in this step (S104) before executing S105, which will be described later, to estimate the vessel self-position. However, in S105, the vessel self-position may be estimated using a result of estimating the sway due to disturbances, which are estimated using a result of measurement by the inertia measurer. By estimating the vessel self-position using a result of measurement by the inertia measurer, the accuracy in recognizing the vessel self-position can be improved.

In S105, mapping processing and vessel self-position estimation are executed. The vacant berth recognition processing unit 108 has pre-input data on the broad-brush shape of the vessel, and where on the vessel (which of the 3D coordinates set on the vessel) the satellite antenna unit 10, the inertial sensor unit 20, and the radar units 30 are installed; therefore, a distance between the vessel and an object detected through reflected waves can be accurately recognized. Not only the vessel self-position but also the direction of the bow can be accurately recognized by the processing mentioned above. Therefore, a map can be generated from the data acquired from reflected waves, estimating that not only the dock but also other vessels and large buoys may exist as objects. In the mapping processing, known map data and sea chart data can also be used for creating a map.

In S106, a mapping result and a vessel self-position estimation result are returned to the main flow, and the base processing ends.

Returning to FIG. 2, in S15, vacant berth recognition processing is executed. FIG. 10 is a flowchart illustrating the vacant berth recognition processing in further detail.

When the vacant berth recognition processing starts, in S201, voxel conversion processing is executed. The voxel conversion processing herein is processing of converting a sparse aggregate of mapping to a definition (or resolution) level at which a structural shape can be recognized. For example, the processing executes classification into three areas: structures, free spaces, and undetermined areas. With this processing, the shape of docks and vacant berths can be recognized in the subsequent steps.

In S202, vacant berth candidates are acquired. Specifically, a dock is extracted from the map acquired by the voxel conversion processing, further acquiring vacant berth candidates having an available space where the vessel 500 can berth at.

Figure 11:
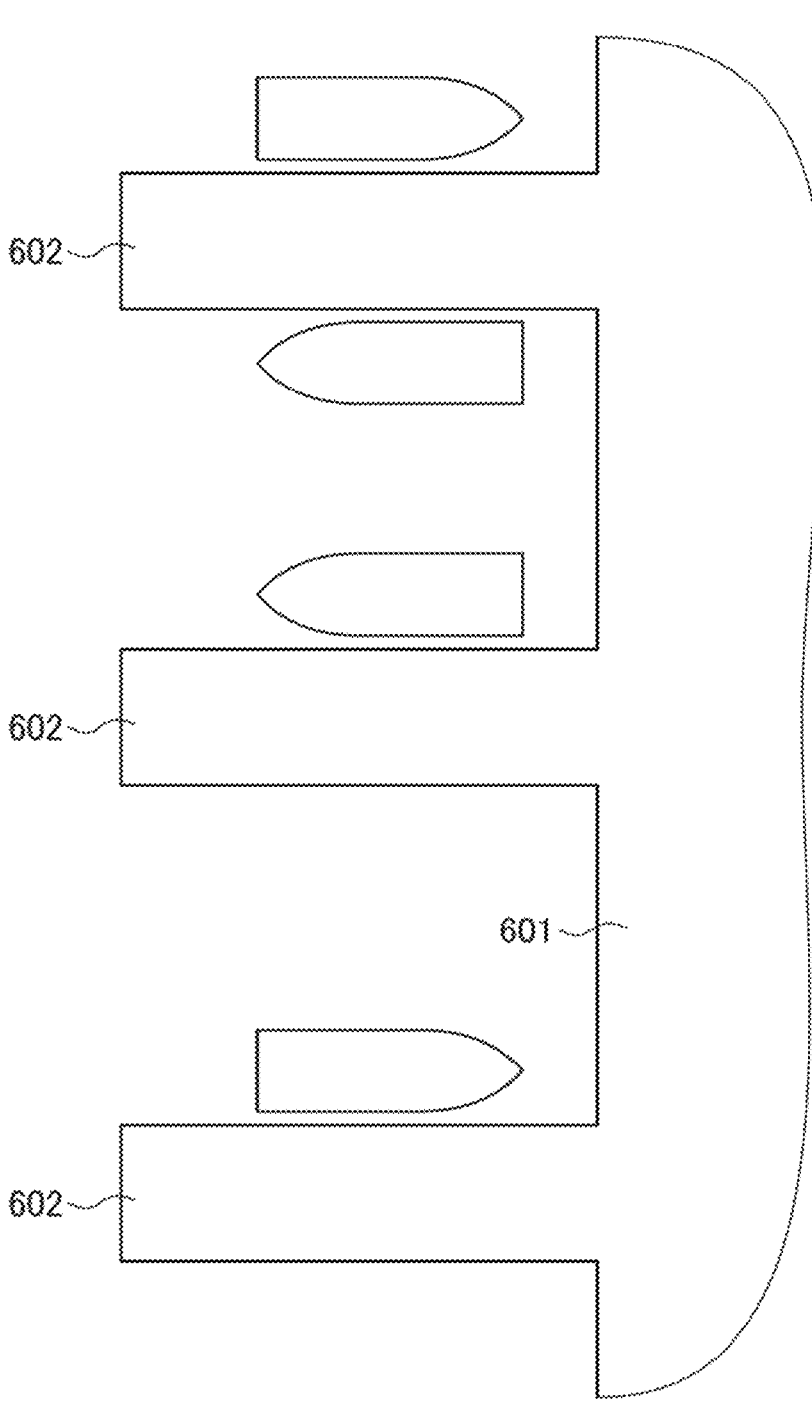
FIG. 11 is a diagram illustrating an example of a Type A dock as viewed from above.

An example the present embodiment is described below, in which appropriate processing is executed for each of the docks classified into two types, Type A and Type B, by the shape of dock. FIG. 11 is a diagram illustrating an example of a Type A dock viewed from above. The dock illustrated in FIG. 11 is classified as Type A, which has a U-shape and includes a walkway (main dock) 601 and two or more fingers (sub-docks) 602 where vessels can berth at.

Figure 12:
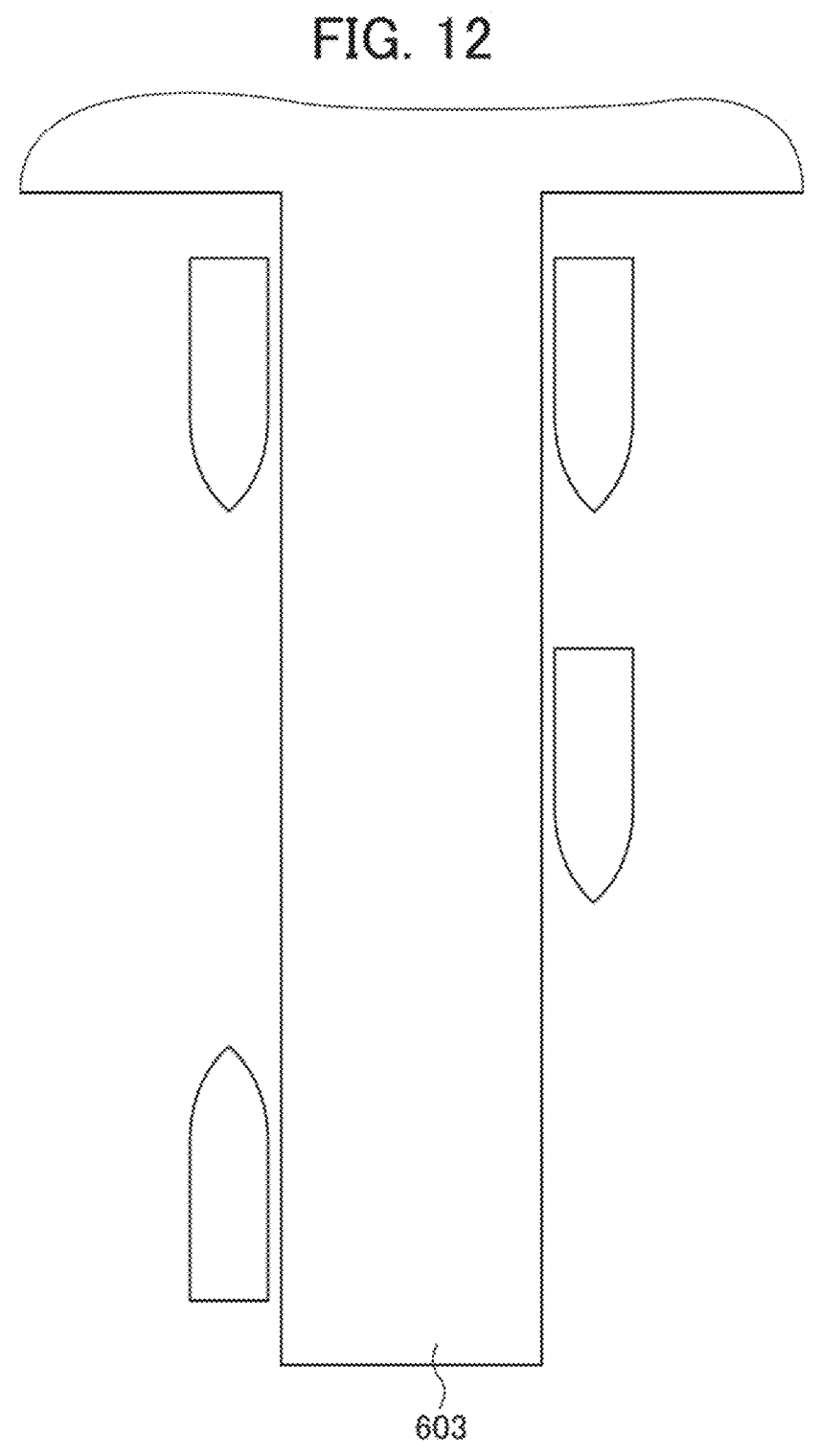

FIG. 12 is a diagram illustrating an example of a Type B dock viewed from above. The dock illustrated in FIG. 12 is classified as Type B where one or more vessels can berth at a walkway 603. Therefore, for example, not only the dock including the walkway 603 that protrudes as illustrated in FIG. 12, but also a dock including a walkway adjacent to the coast or quay wall where one vessel can berth at is classified as a Type B dock. For example, a dock having a walkway connected to fingers or quay walls that are not classified as Type A is also classified as Type B. Note that processing may be executed by classifying docks into more types such as three or more types.

In S203, the vacant berth recognition is executed for Type A. FIG. 13 is a flowchart illustrating the vacant berth recognition for Type A in further detail. When the vacant berth recognition for Type A starts, in S301, a vacant berth entrance is detected.

In S302, the walkway 601 is detected.

In S303, vacant berth candidate filtering processing is executed. The vacant berth candidate filtering processing is processing of extracting berthable vacant berth candidates, based on the shape of the vessel 500 and the positional relationship between the vessel 500 and the vacant berth.

In S304, vacant berth candidate higher-resolution processing is executed. The vacant berth candidate higher-resolution processing is processing of enhancing the resolution of the processing of vacant berths as the berthing candidates extracted in S303 in order to improve the positional accuracy of the vacant berths extracted as candidates. For example, the resolution processed up to S303 was 1 m, whereas the resolution processed is 50 cm. After executing S304, the vacant berth recognition for Type A ends, and the processing returns to the flow of FIG. 10.

In S204, vacant berth recognition for Type B is executed. FIG. 14 is a flowchart illustrating the vacant berth recognition for Type B in further detail. When the vacant berth recognition for Type B starts, the walkway 603 is detected in S401.

In S402, vacant berth candidate filtering processing is executed. The vacant berth candidate filtering processing is processing of extracting berthable vacant berth candidates, based on the shape of the vessel 500 and the positional relationship between the vessel 500 and the vacant berth.

In S403, vacant berth candidate higher-resolution processing is executed. The vacant berth candidate higher-resolution processing in this step is similar to the vacant berth candidate higher-resolution processing in S304 described above. After executing S403, the vacant berth recognition for Type B ends, and the processing returns to the flow of FIG. 10.

In S205, tracking is executed a predetermined number of times using newly acquired satellite data, inertial data, and radar data to repeat the processing from S201 to S204, by chronologically checking a plurality of vacant berth candidates for both Types A and B, whereby further improving the recognition accuracy. Thereafter, the vacant berth recognition processing ends, and the processing returns to the flow of FIG. 2.

Returning to FIG. 2, in S16, determination is made as to whether the dock to berth at has been designated by the user. If a berthing instruction has been given (YES), the processing proceeds to S17, and if a berthing instruction has not been given (NO), the processing proceeds to S18.

In S17, the selected vacant berth and the vessel self-position are displayed in detail on the display receiving unit 40. Such display may be overlaid on the display of the created map, or the selected vacant berth may be displayed more clearly by changing its format and scale from those of the created map. The control data for automatically berthing at the selected vacant berth is outputted to the control device 50. The berthing instructions include data on which side, the portside or starboard side, of the vessel 500 is used for berthing at the dock. In the present embodiment, the processing frequency of the radar units 30 provided on the side opposite to the berthing side is reduced. For example, when the portside berthing instruction is given, data from the radar units 31, 35, 37 on the starboard side is processed less frequently to reduce the load on the control unit. As a result, the computational load on the vessel-maneuvering data processing unit 100 can be reduced. Therefore, for example, when the processing starts to reduce the processing frequency of the radar units 30 provided on the side opposite to the berthing side, the processing load for outputting to the control device 50 is reduced, and the computational load on the vessel-maneuvering data processing unit 100 will not increase, allowing stable processing to be executed. As a specific method of reducing the processing frequency, the number of radar wave transmissions may be reduced, or the data used for processing may be decimated without changing the number of radar wave transmissions. Since the output of control data is continuous, for example, the processing of reducing the processing frequency of the radar units 30 provided on the side opposite to the berthing side may be executed when the distance between the dock and the vessel 500 becomes a predetermined distance or shorter (for example, 20 m).

In S18, processing of displaying the vacant berth candidates and the vessel self-position on the display receiving unit 40 is executed. Such display is overlaid on the display of the created map.

As described above, according to the maneuvering control device for vessels of the present embodiment, and the vessel equipped with this maneuvering control device, unnecessary components can be effectively removed from the reflected waves, and the accuracy in recognizing a dock can be improved. Therefore, data on docks can be accurately displayed, enabling more accurate berthing, whether automatic or manual.

12

Modified Embodiment

The embodiment described above is not limiting, and various modifications and changes are possible, which are also within the scope of the present disclosure.

(1) In the embodiment, any size or type of the vessel 500 may be acceptable. For example, the vessel 500 may be a small boat or a large vessel. The vessel 500 may also be a merchant vessel, a leisure vessel, or a fishing boat.

(2) In the embodiment, an example has been described in which the vessel self-position is estimated using both satellite data and inertial data. Not limiting to this, for example, an embodiment may use only satellite data for estimating a vessel self-position.

(3) In the embodiment, an example has been described in which a dock is extracted and recognized by removing received values below the threshold of the reflected waves. Not limiting to this, other objects may further be extracted and recognized by utilizing the fact that a received value (intensity) of reflected waves may vary depending on the object. For example, the position of a cleat provided on the dock can be estimated by acquiring in advance the reflection intensity specific to the cleat. In this case, the vessel can berth directly next to the cleat, or the vessel can berth such that the cleat of the vessel matches the cleat of the dock.

The embodiment and the modified embodiment can be combined as appropriate, and detailed description thereof is omitted. The present disclosure is not limited by the various embodiments described above.

EXPLANATION OF REFERENCE NUMERALS

1: maneuvering control device
10: satellite antenna unit
20: inertial sensor unit
30: radar unit
31: first radar unit
32: second radar unit
33: third radar unit
34: fourth radar unit
35: fifth radar unit
36: sixth radar unit
37: seventh radar unit
38: eighth radar unit
40: display receiving unit
50: control device
100: maneuvering data processing unit
101: satellite data receiver unit
102: satellite data processing unit
103: inertial data receiver unit
104: inertial data processing unit
105: radar data receiver unit
106: radar data processing unit
107: base processing unit
108: vacant berth recognition processing unit
109: display processing unit
110: reception processing unit
111: control data output unit
500: vessel (hull)
600: dock
601: walkway
603: walkway
P: vessel self-position data acquisition unit
R: radar device

What is claimed is:
1. A maneuvering control device for vessels, the device comprising:

a vessel self-position data acquirer that acquires position data on itself;

a radar device arranged on a hull, the radar device including a plurality of radar units each including a transmitter transmitting a radio wave around the hull and a receiver receiving a reflected wave from an object of a radio wave transmitted by the transmitter;

a processor that creates a map and estimates a vessel self-position by using the position data acquired by the vessel self-position data acquirer and data on the reflected wave received by the radar device; and a receiving unit that receives a berthing instruction from a user, wherein the processor removes data of received values below a threshold of a detection level from the data on the reflected wave, the data on the reflected wave including data of detection level of received value regarding amount of reflection of radio wave, and creates a map by using data on a reflected wave that has been detected a predetermined number of times within a predetermined period of time in a range that can be considered to be the same point, among the data on the reflected: wave, wherein the receiving unit receives the berthing instruction including at least an instruction on a berthing side of the hull, and wherein the processor decreases processing frequency of the radar units provided on a side opposite to the berthing side instructed in the berthing instruction.

2. The maneuvering control device for vessels according to claim 1, wherein the vessel self-position data acquirer includes an inertia measurer that measures an inertial system, and wherein the processor estimates a vessel self-position by using a result of estimating a sway due to a disturbance by using a result of measurement by the inertia measurer.

3. The maneuvering control device for vessels according to claim 1, wherein transmission timings of at least adjacent radar units are out of synchronization.

4. The maneuvering control device for vessels according to claim 1, wherein the processor removes a reflected wave with an RCS value below a threshold to create a map, the processor calculating the RCS from the data on the reflected wave.

5. The maneuvering control device for vessels according to claim 1, wherein the processor estimates a dock in the map created, and executes processing of recognizing a berthable dock, based on a shape of the dock estimated.

6. The maneuvering control device for vessels according to claim 5, wherein, when the dock is estimated to have a U-shape including a walkway and two or more fingers where the vessels can berth at, a berthable vacant berth is extracted after detecting a vacant berth entrance.

7. The maneuvering control device for vessels according to claim 5, wherein, when the dock is estimated to include a berthable walkway, a berthable vacant berth is extracted without detecting a vacant berth entrance.

8. A vessel, comprising:

a hull;

a vessel self-position data acquirer that acquires position data on itself;

a radar device arranged on the hull, the radar device including a plurality of radar units each including a transmitter transmitting a radio wave around the hull and a receiver receiving a reflected wave from an object of a radio wave transmitted by the transmitter;

a processor that creates a map and estimates a vessel self-position by using the position data acquired by the vessel self-position data acquirer and data on the reflected wave received by the radar device; and a receiving unit that receives a berthing instruction from a user, wherein the processor removes data of received values below a threshold of a detection level from the data on the reflected wave, the data on the reflected wave including data of detection level of received value regarding amount of reflection of radio wave, and creates a map by using data on a reflected wave that has been detected a predetermined number of times within a predetermined period of time in a range that can be considered to be the same point, among the data on the reflected wave, wherein the receiving unit receives the berthing instruction including at least an instruction on a berthing side of the hull, and wherein the processor decreases processing frequency of the radar units provided on a side opposite to the berthing side instructed in the berthing instruction.

* * * * *